US011947676B2

(12) United States Patent
Spitz et al.

(10) Patent No.: US 11,947,676 B2
(45) Date of Patent: Apr. 2, 2024

(54) PROCESSOR SYSTEM WITH A COMMUNICATION INTERFACE

(71) Applicant: Secure Thingz Ltd., Trumpington (GB)

(72) Inventors: Stephan Spitz, Karlsfeld (DE); Haydn Povey, Trumpington (GB); Tim Woodruff, Cambridge (GB)

(73) Assignee: SECURE THINGZ LTD., Cambridge (GB)

( * ) Notice: Subject to any disclaimer, the term of this patent is extended or adjusted under 35 U.S.C. 154(b) by 61 days.

(21) Appl. No.: 17/018,160

(22) Filed: Sep. 11, 2020

(65) Prior Publication Data

US 2021/0073388 A1 Mar. 11, 2021

(30) Foreign Application Priority Data

Sep. 11, 2019 (EP) .................................... 19196796

(51) Int. Cl.
*G06F 21/57* (2013.01)
*G06F 9/44* (2018.01)
(Continued)

(52) U.S. Cl.
CPC .......... *G06F 21/575* (2013.01); *G06F 9/4406* (2013.01); *G06F 21/602* (2013.01);
(Continued)

(58) Field of Classification Search
CPC .... G06F 21/575; G06F 21/602; G06F 9/4406; H04L 9/088; H04L 9/0894; H04L 9/14; H04L 9/3247
See application file for complete search history.

(56) References Cited

U.S. PATENT DOCUMENTS 10,078,754 B1* 9/2018 Brandwine ........... G06F 21/602
10,303,621 B1* 5/2019 Diamant ............. G06F 12/1408
(Continued)

FOREIGN PATENT DOCUMENTS

| EP | 3509003 A1 | 7/2019 |
| WO | 2007135672 A2 | 11/2007 |
| WO | 2017188976 A1 | 11/2017 |

OTHER PUBLICATIONS

Extended European Search Report from corresponding Application No. EP19196796.7, dated Jan. 31, 2020.

*Primary Examiner* — Jaweed A Abbaszadeh
*Assistant Examiner* — Cheri L Harrington
(74) *Attorney, Agent, or Firm* — Workman Nydegger

(57) ABSTRACT

A processor system includes a processor and a first memory area storing a boot program code. The boot program code starts execution of the operating system when executed by the processor, performs a cryptographic operation when processor executes the boot program code. A second memory area stores one or more cryptographic keys and is only accessible to the boot program code. A third memory stores the operating system. A communication interface receives data over a communication network. The processor retrieves the boot program code from the first memory area and executes the boot program code to start execution of the operating system. The processor terminates execution of the boot program code. The processor is configured to re-execute the boot program code while the operating system is executed to cryptographically encrypt data upon the basis of the cryptographic keys stored in the second memory area.

17 Claims, 2 Drawing Sheets

(51) Int. Cl.
*G06F 9/4401* (2018.01)
*G06F 21/60* (2013.01)
*H04L 9/08* (2006.01)
*H04L 9/14* (2006.01)
*H04L 9/32* (2006.01)

(52) U.S. Cl.
CPC ............ *H04L 9/088* (2013.01); *H04L 9/0894* (2013.01); *H04L 9/14* (2013.01); *H04L 9/3247* (2013.01); *G06F 2221/034* (2013.01)

(56) References Cited

U.S. PATENT DOCUMENTS

| | | | | |
|---|---|---|---|---|
| 2006/0090084 | A1* | 4/2006 | Buer | G06F 21/53 |
| | | | | 713/189 |
| 2006/0179324 | A1* | 8/2006 | Hatakeyama | G06F 21/575 |
| | | | | 711/E12.092 |
| 2010/0011200 | A1* | 1/2010 | Rosenan | G06F 21/575 |
| | | | | 713/2 |
| 2019/0005244 | A1* | 1/2019 | Brasher | G06F 12/145 |
| 2019/0005245 | A1* | 1/2019 | Laffey | G06F 3/0632 |
| 2020/0193025 | A1* | 6/2020 | Jacquin | H04L 9/3234 |
| 2020/0320007 | A1* | 10/2020 | Hesse | G06F 7/588 |

\* cited by examiner

PROCESSOR SYSTEM WITH A COMMUNICATION INTERFACE

TECHNICAL FIELD

In general, the present invention relates to the field of computer security.

BACKGROUND

Electronic communication devices, such as computers, mobile phones or IoT (IoT: Internet of things) devices in general, usually include one or more processors configured to execute a program code, such as an application code, firmware code or, generally, an operation code, for performing different operations, such as processing data and/or communicating with other electronic communication devices in a communication network.

In order to securely operate electronic communication devices, a secure boot, which essentially is provided by a boot program code that can be executed by a processor, can be deployed to ensure that the electronic communication devices boot, i.e. start operations, using only software that is trusted by the Original Equipment Manufacturer (OEM).

When an electronic communication device is started with a secure boot, the firmware checks the signature of each piece of boot software, including UEFI (Unified Extensible Firmware Interface) firmware, EFI (Extensible Firmware Interface) applications, and the operating system. If the signatures are valid, the electronic communication device boots, and the firmware gives control to the operating system.

Secure boot is typically executed merely once when an operation system of the electronic communication device is booted up.

In light of the above, there is a need for improving efficiency and security of an electronic communication device when the operation system is already being executed.

SUMMARY

It is an object of the invention to provide a more secure and efficient processor system.

The foregoing and other objects are achieved by the subject matter of the independent claims. Further implementation forms are apparent from the dependent claims, the description and the figures.

Generally, the present invention relates to a processor system that is operable by an operating system. The processor system enables a secure boot code to be available for the operating system and its applications.

In this way, embodiments of the present invention enable credential provisioning in the secure boot for later usage in the service stack by the operation system and its applications. The embodiments of the present invention can also utilize the secure boot code for security services in a higher service protocol stack.

The embodiments of the invention can be implemented in the following use cases with high security: cellular and non-cellular network authentication; cloud authentication; TLS (transport layer security) authentication and end-to-end encryption; authentication and authorization of (partial) firmware/OS/application updates; online device attestation; online device identity proof; overproduction count and grey-market prevention; secure software/application disabling (end-of-life).

The invention is based on the finding, that code and data of the secure boot program are not usable when the operation system is up and running, i.e., the secure boot is not available anymore for later usage in the service stack by the operation system. In order to obtain a more efficient and secure electronic communication device, a boot program can be re-used for security purposes such as cryptographic operations as well. Thereby, the advantages of a boot program code such as access right management, can be exploited or even further enhanced for security operations.

More specifically, according to a first aspect the invention relates to a processor system being operable by an operating system, wherein the processor system comprises: a processor; a first memory area being configured to store a boot program code, the boot program code being configured to start execution of the operating system when executed by the processor, the boot program code being further configured for performing a cryptographic operation when the boot program code is executed by the processor; a second memory area being configured to store one or more cryptographic keys, wherein the second memory area is only accessible to the boot program code, when the boot program code is executed by the processor; a third memory area being configured to store the operating system when executed by the processor; and a communication interface being configured to receive data over a communication network.

The processor is configured to retrieve the boot program code from the first memory area, and to execute the boot program code in order to start execution of the operating system, and the processor is configured to terminate execution of the boot program code while the operating system is being executed by the processor.

Furthermore, the processor is configured to re-execute the boot program code while the operating system is being executed in order to cryptographically encrypt data upon the basis of the cryptographic keys stored in the second memory area.

The memory areas can be implemented in the same physical memory, e.g. as memory partitions, or can be implemented in two or more physical memories. The memory areas can be separately addressable by the processor.

The boot program code is functional when executed by the processor. The operating system is implemented as a program code, e.g. as a firmware program code, and provides functionality of the processor system, such as processing data.

In a further possible implementation form of the first aspect, the boot program code can form the boot program or a part of the boot program.

In a further possible implementation form of the first aspect, the operating system can be stored as operating system program code that is executed by the processor in order to execute the operating system.

The memory areas can be implemented in the same physical memory, e.g. as memory partitions, or can be implemented in two or more physical memories. The memory areas can be separately addressable by the processor.

The boot program code is functional when executed by the processor. The operating system is implemented as a program code, e.g. as a firmware program code, and provides functionality of the processor system, such as processing data.

Thus, an improved processor system is provided, strengthening security of the processor system and improving efficiency and security of using secure boot for the processor system.

In a further possible implementation form of the first aspect, the processor is configured to re-execute the boot program code while the operating system is being exchanging data over the communication interface in order to cryptographically encrypt data for sending or decrypt received data upon the basis of the cryptographic keys stored in the second memory area.

In a further possible implementation form of the first aspect, the processor is configured to perform an encryption and/or a decryption operation as the cryptographic operation when the boot program code is executed by the processor.

Thus, only the operating system or its applications that are trusted by the original equipment manufacturer of the processor system can be used.

In a further possible implementation form of the first aspect, the processor is configured to re-activate the boot program code in the first memory area in order to re-execute the boot program code.

Thus, the boot program code can be executed successfully.

In a further possible implementation form of the first aspect, at least two memory areas of the first, second and third memory areas are arranged in different physical memories of the processor system, or the first, the second and the third memory areas are located in the same physical memory of the processor system.

Thus, this increases the security of using the boot program code.

In a further possible implementation form of the first aspect, the processor is configured to grant access to the cryptographic keys in the second memory area only to the boot program code located in the first memory area when the boot program code is being executed, in particular when the program code and the operational system are being executed.

Thus, this increases the security of the processor system and ensures that only software or applications that are trusted by the original equipment manufacturer can be used.

In a further possible implementation form of the first aspect, the operating system stored in the third memory area is prohibited or does not have an access right to access to the cryptographic keys in the second memory area when executed by the processor.

Thus, this improves the security of the processor system and ensures that only software or applications that are trusted by the original equipment manufacturer can be used.

In a further possible implementation form of the first aspect, the operating system is stored encrypted in the third memory area, and the boot program code is configured to use the cryptographic keys stored in the second memory area for decrypting the operating system before execution.

This ensures that only software or applications that are trusted by the original equipment manufacturer can be used.

In a further possible implementation form of the first aspect, a first hash value of the operating system is stored in the first or in the second memory area and the boot program code is configured, when executed by the processor, to calculate a second hash value of the operating system, to compares the first hash value with the second hash value, and the processor is configured to execute the operating system only if the first hash value equals to the second hash value.

Thus, the operating system that can be trusted is executed successfully to operate the processor system.

In a further possible implementation form of the first aspect, the first hash value is encrypted and the boot program code is configured to decrypt the first hash value before comparing the first hash value with the second hash value using the cryptographic keys stored in the second memory area.

Thus, the first hash value of the operating system can be decrypted in a secure manner.

In a further possible implementation form of the first aspect, the boot program code is split up in a first level boot program code and a second level boot program code, wherein the first level boot program code is configured to decrypt the second level boot program code using the cryptographic keys stored in the second memory area.

This improves the security of using the boot program code for secure boot in the processor system.

In a further possible implementation form of the first aspect, the first and second level boot program codes are stored in different memory areas, in particular in different isolated memory areas.

This improves the security of using the boot program code for secure boot in the processor system.

In a further possible implementation form of the first aspect, the memory areas are isolated from each other by a physical memory protection.

This improves the security of using the boot program code for secure boot in the processor system.

In a further possible implementation form of the first aspect, the processor system further comprises an application programming interface for triggering the execution of the boot program code, in particular for performing a cryptographic encryption and decryption operation.

Thus, an improved application programming interface is provided, increasing the security of the boot program code for secure boot in the processor system.

In a further possible implementation form of the first aspect, the operating system is configured to implement an application when executed by the processor, and the application is configured to trigger execution of the boot program code via the application programming interface.

Thus, an improved application programming interface is provided, increasing the security of the boot program code for secure boot in the processor system and preventing the application or the operating system from accessing or modifying the boot program code.

In a further possible implementation form of the first aspect, the processor is configured to execute the operating system.

Thus, the operation system can be executed to operate the processor system.

In a further possible implementation form of the first aspect, the communication interface is configured to receive the data, and the processor is configured to execute the boot program code in order to cryptographically verify the received data.

Thus, the received data can be verified to be trusted in a secure manner.

In a further possible implementation form of the first aspect, the received data is digitally signed, and the processor is configured to verify the digital signature of the data by executing the boot program code upon the basis of the cryptographic keys.

Thus, the received data can be verified to be trusted upon the basis of the cryptographic keys in a secure manner.

The invention can be implemented in hardware and/or software.

BRIEF DESCRIPTION OF THE DRAWINGS

Further embodiments of the invention will be described with respect to the following figures, wherein.

In the various figures, identical reference signs will be used for identical or at least functionally equivalent features.

DETAILED DESCRIPTION OF EMBODIMENTS

In the following description, reference is made to the accompanying drawings, which form part of the disclosure, and in which are shown, by way of illustration, specific aspects in which the present invention may be placed. It will be appreciated that other aspects may be utilized and structural or logical changes may be made without departing from the scope of the present invention. The following detailed description, therefore, is not to be taken in a limiting sense, as the scope of the present invention is defined by the appended claims.

For instance, it will be appreciated that a disclosure in connection with a described method may also hold true for a corresponding device or system configured to perform the method and vice versa. For example, if a specific method step is described, a corresponding device may include a unit to perform the described method step, even if such unit is not explicitly described or illustrated in the figures.

Moreover, in the following detailed description as well as in the claims embodiments with different functional blocks or processing units are described, which are connected with each other or exchange signals. It will be appreciated that the present invention covers embodiments as well, which include additional functional blocks or processing units that are arranged between the functional blocks or processing units of the embodiments described below.

Finally, it is understood that the features of the various exemplary aspects described herein may be combined with each other, unless specifically noted otherwise.

Generally, embodiments of the present invention provide an improved processor system which is operable by an operating system and enables a secure boot code to be utilized for the operating system and its applications. Thus, embodiments of the present invention can in particular increase efficiency of using the secure boot as well as security of the system.

Figure 1:
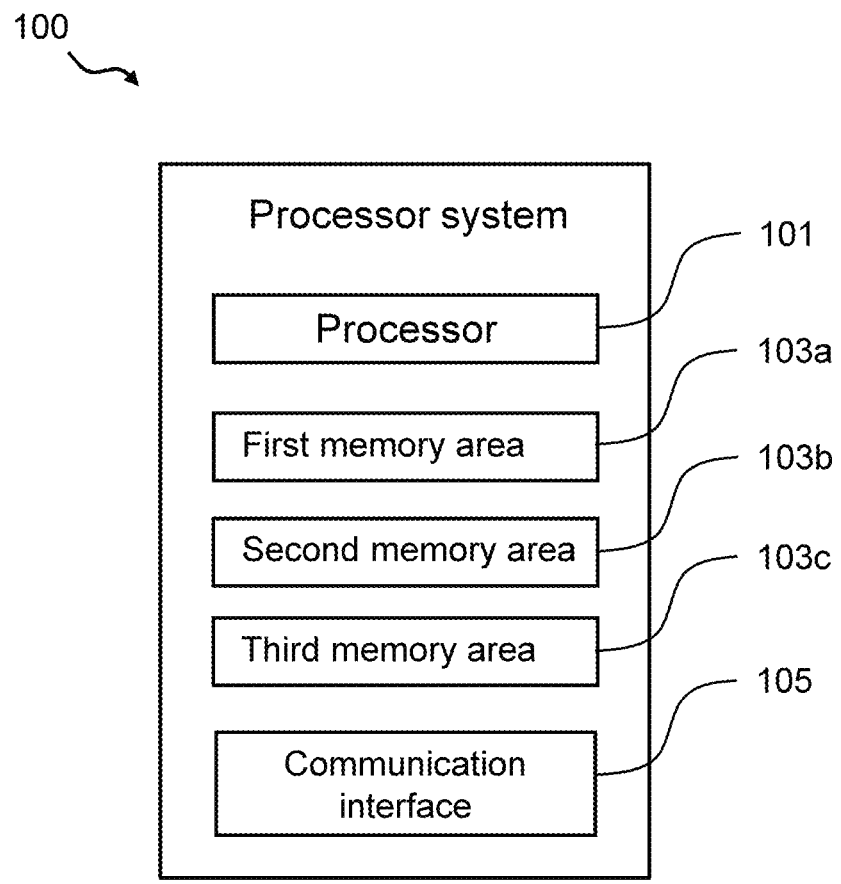
FIG. 1 shows a schematic diagram illustrating a processor system according to an embodiment.

As will be described in more detail below under reference to FIG. 1, embodiments of the invention relate to a processor system 100 which is operable by an operating system. The processor system 100 comprises a processor 101, a first memory area 103a, a second memory area 103b, a third memory area 103c and a communication interface 105, wherein, the processor 101 is configured to execute the operating system.

In an embodiment, at least two memory areas of the first, second and third memory areas 103a-c are arranged in different physical memories of the processor system 100. Alternatively, the first, the second and the third memory areas 103a-c are located in the same physical memory of the processor system 100. In a further embodiment, the memory areas are isolated from each other by a physical memory protection.

In an embodiment, the first memory area 103a is configured to store a boot program code that can start execution of the operating system when executed by the processor 101 and perform a cryptographic operation which can be an encryption and/or a decryption operation performed by the processor 101. Further, the boot program code can form a boot program or a part of the boot program.

In an embodiment, the second memory area 103b is configured to store one or more cryptographic keys, wherein the second memory area 103b is only accessible to the boot program code when the boot program code is executed by the processor 101.

In an embodiment, the third memory area 103c is configured to store the operating system when executed by the processor 101, wherein the operating system can be stored as operating system program code that is executed by the processor 101 in order to execute the operating system.

More specifically, the processor 101 is configured to retrieve the boot program code from the first memory area 103a, and to execute the boot program code in order to start execution of the operating system, and the processor 101 is configured to terminate execution of the boot program code while the operating system is being executed by the processor 101.

In an embodiment, the processor 101 is configured to re-activate the boot program code in the first memory area 103a to re-execute the boot program code while the operating system is being executed, in order to cryptographically encrypt data upon the basis of the cryptographic keys stored in the second memory area 103b.

The processor 101 is further configured to grant access to the cryptographic keys in the second memory area 103b only to the boot program code located in the first memory area 103a when the boot program code is being executed, in particular when the program code and the operational system are being executed.

On the other hand, the operating system stored in the third memory area 103c is prohibited or does not have an access right to access to the cryptographic keys in the second memory area 103b when executed by the processor 101. The operating system is stored encrypted in the third memory area 103c, and the boot program code is configured to use the cryptographic keys stored in the second memory area 103b for decrypting the operating system before execution.

In a further embodiment, the communication interface 105 is configured to receive data over a communication network and the processor 101 is configured to execute the boot program code in order to cryptographically verify the received data.

In an embodiment, the communication interface 105 can the receive data over the communication network from the operation system and/or applications or software running on top of the operation system.

Furthermore, the received data is digitally signed, and the processor 101 is configured to verify the digital signature of the data by executing the boot program code upon the basis of the cryptographic key. The processor 101 is further configured to returns the verification result to the operation system and/or applications or software running on top of the operation system.

The embodiments of the invention thus enable a secure boot code as low-level functional code being protected from modifications or optionally also from read access of the higher software stack layers.

In a further embodiment, a first hash value of the operating system is encrypted and stored in the first 103a or in the second memory area 103b. When executed by the processor 101, the boot program code is configured to decrypt the first hash value using the cryptographic keys stored in the second memory area 103b and calculate a second hash value of the operating system.

Afterwards, the boot program code is then configured to compare the first hash value with the second hash value. The processor 101 is configured to execute the operating system only if the first hash value equals to the second hash value.

In a further embodiment, the boot program code is split up in a first level boot program code and a second level boot program code, wherein the first level boot program code is configured to decrypt the second level boot program code using the cryptographic keys stored in the second memory area 103b. The first and second level boot program codes are stored in different memory areas, in particular in different isolated memory areas.

In a further embodiment, the processor system 100 comprises an application programming interface for triggering the execution of the boot program code, in particular for performing a cryptographic encryption and decryption operation.

Moreover, the operating system is configured to implement an application when executed by the processor 101 and the application is configured to trigger execution of the boot program code via the application programming interface.

Figure 2:
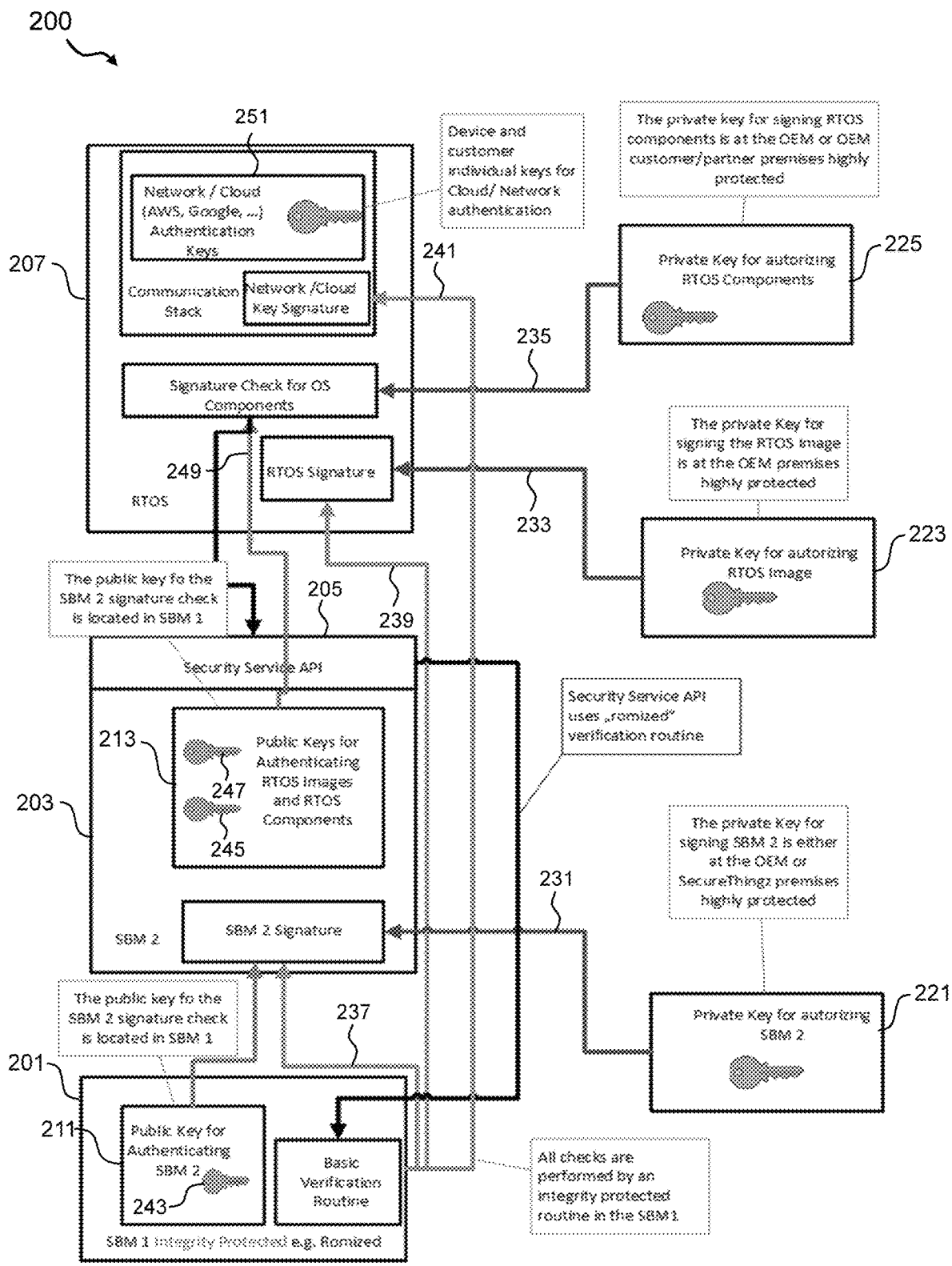
FIG. 2 shows a schematic diagram illustrating a processor system according to an embodiment.

FIG. 2 further shows a schematic diagram illustrating a processor system 200 according to an embodiment, wherein the processor system 200 comprises the following components: a secure boot manager 201, 203; a secure key storage 211, 213, a security service API (application programming interface) 205 and a real-time operation system (RTOS) 207.

In an embodiment, the secure boot manager (SBM) 201, 203 can be optionally split in a first level boot SBM1 201 and a second level boot SBM2 203. This secure boot manager 201, 203 contains cryptographic keys and security critical functions, e.g. for integrity verification of code and data or cryptographic routines.

In an embodiment, the code and data of the secure boot manager 201, 203 cannot be modified by a higher level of the software stack. A replacement of the SBM (or the SBM1 201) on a device is not possible. In addition, the data fields containing secure keys in the SBM 201, 203 are read protected for the higher layers of the software stack, such as an OS kernel, OS services and applications.

Furthermore, the secure key storage 211, 213 is located in the secure boot manager (SBM) 201, 203, optionally in SBM1 201 and SBM2 203 in case the bootloader is split up. In a further embodiment, the security service API (application programming interface) 205 is exposed SBM functions to the real-time operating system (RTOS) 207 and its applications.

In a further embodiment, an external personalization system personalizes the SBM 201, 203 with individual keys, which can be later used in conjunction with security functions exposed via the application programming interface (API) 205 to the real-time operating system (RTOS) 207 or applications.

In an embodiment, an external entity such as the external personalization system, or the device itself, i.e. the processor system 200, generates cryptographic keys and then a secure link between the device and the personalization system is established. The secure link can be either a physically secured link or an encrypted channel. Corresponding are shared between the personalization system and the secure key storage 211, 213 in the secure boot manager 201, 203 i.e. either public private key pairs or the same symmetric key.

As can be seen from FIG. 2, signatures can be externally generated with off-device stored private keys out of the processor system 200.

In an embodiment, the second level boot SBM2 203 can be signed by the private key 221, as indicated by a link 231. The private key 221 can be generated by the external personalization system for authorizing the SBM2 203. Further, the private key 221 can be highly protected for instance at the Original Equipment Manufacturer (OEM).

In an embodiment, RTOS images can be signed by the private key 223, as indicated by a link 233. The private key 223 can be generated by the external personalization system for authorizing the RTOS images. Further, the private key 223 can be highly protected for instance at the Original Equipment Manufacturer (OEM).

In an embodiment, RTOS components can be signed by the private key 225, as indicated by a link 235. The private key 225 can be generated by the external personalization system for authorizing the RTOS components. Further, the private key 225 can be highly protected for instance at the Original Equipment Manufacturer (OEM) or a customer/partner of the OEM.

As can also be seen from FIG. 2, signatures can be verified with on-the-device stored public keys which are stored in the processor system as well.

In an embodiment, the signature of the second level boot SBM2 203 can be verified by a public key 243, as indicated by a link 237. The public key 243 for authenticating the SBM2 203 is stored in the secure key storage 211 in the secure boot manager SBM1 201.

In an embodiment, the RTOS images can be verified by a public key 245, as indicated by a link 239. The public key 245 for authenticating the RTOS images is stored in the secure key storage 213 in the second level boot SBM2 203.

In an embodiment, the RTOS components can be verified by a public key 247, as indicated by a link 249. The public key 247 for authenticating the RTOS components is stored in the secure key storage 213 in the second level boot SBM2 203.

In a further embodiment, the Network/Cloud communications can be verified by device and customer individual keys 251, as indicated by a link 241. The individual keys 251 for Network/Cloud authentication can be stored in the real-time operating system (RTOS) 207.

The embodiments of the invention allow for a secure binding of keys between the secure boot manager (SBM) in the device and an external trusted entity, the personalization system, outside the device.

According to a further embodiment, a software can request security support via the security service application programming interface (API) 205 of the secure boot manager 201, 203. Such a "security support request" can be a request to verify a digital signature based on a public key anchored in the secure boot manager 201, 203 as shown in FIG. 2.

The secure boot manager 201, 203 then executes the requested service routine and returns the result to the software in the higher software stack e.g. the real-time operating system 207 or an application running on top of the real-time operating system 207.

The embodiments of the invention enable a boot program code for the SBM which is as low-level functional code protected from modifications or optionally also read access of the higher software stack layers.

While a particular feature or aspect of the disclosure may have been disclosed with respect to only one of several implementations or embodiments, such feature or aspect may be combined with one or more other features or aspects of the other implementations or embodiments as may be desired and advantageous for any given or particular application. Furthermore, to the extent that the terms "include", "have", "with", or other variants thereof are used in either the detailed description or the claims, such terms are intended to be inclusive in a manner similar to the term "comprise". Also, the terms "exemplary", "for example" and "e.g." are merely meant as an example, rather than the best or optimal. The terms "coupled" and "connected", along with derivatives may have been used. It should be understood that these terms may have been used to indicate that two elements cooperate or interact with each other regardless whether they are in direct physical or electrical contact, or they are not in direct contact with each other.

Although specific aspects have been illustrated and described herein, it will be appreciated by those of ordinary skill in the art that a variety of alternate and/or equivalent implementations may be substituted for the specific aspects shown and described without departing from the scope of the present disclosure. This application is intended to cover any adaptations or variations of the specific aspects discussed herein.

Although the elements in the following claims are recited in a particular sequence with corresponding labeling, unless the claim recitations otherwise imply a particular sequence for implementing some or all of those elements, those elements are not necessarily intended to be limited to being implemented in that particular sequence.

Many alternatives, modifications, and variations will be apparent to those skilled in the art in light of the above teachings. Of course, those skilled in the art readily recognize that there are numerous applications of the invention beyond those described herein. While the present invention has been described with reference to one or more particular embodiments, those skilled in the art recognize that many changes may be made thereto without departing from the scope of the present invention. It is therefore to be understood that within the scope of the appended claims and their equivalents, the invention may be practiced otherwise than as specifically described herein.

The invention claimed is:

1. A processor system being operable by an operating system, the processor system comprising:
   a processor;
   a first memory area being configured to store a boot program code, wherein the boot program code forms a part of a boot program which is re-usable when the operating system is executed, the boot program code being configured for performing a cryptographic operation when the boot program code is executed by the processor;
   a second memory area being configured to store one or more cryptographic keys, wherein the second memory area is only accessible to the boot program code, when the boot program code is executed by the processor;
   a third memory area being configured to store the operating system when executed by the processor;
   a communication interface being configured to receive data over a communication network;
   wherein the processor is configured to retrieve the boot program code from the first memory area, and to execute the boot program code in order to start execution of the operating system, and to terminate execution of the boot program code while the operating system is being executed by the processor;
   wherein the processor is configured to re-execute the boot program code while the operating system is simultaneously being executed in order to cryptographically encrypt the data upon the basis of the cryptographic keys stored in the second memory area; and
   wherein the processor is configured to re-execute the boot program code while the operating system is simultaneously exchanging data over the communication interface in order to cryptographically encrypt data for sending or decrypt received data upon the basis of the cryptographic keys stored in the second memory area.

2. The processor system according to claim 1, wherein the processor is configured to perform an encryption and/or a decryption operation as the cryptographic operation when the boot program code is executed by the processor.

3. The processor system according to claim 1, wherein the processor is configured to re-activate the boot program code in the first memory area in order to re-execute the boot program code.

4. The processor system according to claim 1, wherein at least two memory areas of the first, second and third memory areas are arranged in different physical memories of the processor system, or
   wherein the first, the second and the third memory areas are located in the same physical memory of the processor system.

5. The processor system according to claim 1, wherein the processor is configured to grant access to the cryptographic keys in the second memory area only to the boot program code located in the first memory area when the boot program code is being executed, in particular when the program code and the operational system are being executed.

6. The processor system according to claim 1, wherein the operating system stored in the third memory area is prohibited or does not have an access right to access to the cryptographic keys in the second memory area when executed by the processor.

7. The processor system according to claim 1, wherein the operating system is stored encrypted in the third memory area, and
   wherein the boot program code is configured to use the cryptographic keys stored in the second memory area for decrypting the operating system before execution.

8. The processor system according to claim 1, wherein a first hash value of the operating system is stored in the first or in the second memory area,
   wherein the boot program code is configured, when executed by the processor, to calculate a second hash value of the operating system, to compares the first hash value with the second hash value, and
   wherein the processor is configured to execute the operating system only if the first hash value equals to the second hash value.

9. The processor system according to claim 8, wherein the first hash value is encrypted and wherein the boot program code is configured to decrypt the first hash value before comparing the first hash value with the second hash value using the cryptographic keys stored in the second memory area.

10. The processor system according to claim 1, wherein the boot program code is split up in a first level boot program code and a second level boot program code,
    wherein the first level boot program code is configured to decrypt the second level boot program code using the cryptographic keys stored in the second memory area.

11. The processor system according to claim 10, wherein the first and second level boot program codes are stored in different memory areas, in particular in different isolated memory areas.

12. The processor system according to claim 1, wherein the memory areas are isolated from each other by a physical memory protection.

13. The processor system according to claim 1, further comprising an application programming interface for triggering the execution of the boot program code, in particular for performing a cryptographic encryption and decryption operation.

14. The processor system according to claim 13, wherein the operating system is configured to implement an application when executed by the processor, and
wherein the application is configured to trigger execution of the boot program code via the application programming interface.

15. The processor system according to claim 1, wherein the processor is configured to execute the operating system.

16. The processor system according to claim 1, wherein the communication interface is configured to receive the data, and
wherein the processor is configured to execute the boot program code in order to cryptographically verify the received data.

17. The processor system according to claim 1, wherein the received data is digitally signed, and
wherein the processor is configured to verify the digital signature of the data by executing the boot program code upon the basis of the cryptographic keys.

* * * * *